US011216501B2

(12) United States Patent
Vallabhajosyula et al.

(10) Patent No.: US 11,216,501 B2
(45) Date of Patent: Jan. 4, 2022

(54) METHOD AND APPARATUS TO MORE QUICKLY CLASSIFY ADDITIONAL TEXT ENTRIES

(71) Applicant: Walmart Apollo, LLC, Bentonville, AR (US)

(72) Inventors: Mallikharjuna M. Vallabhajosyula, Bangalore (IN); Ojaswini Chhabra, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 68 days.

(21) Appl. No.: 16/562,813

(22) Filed: Sep. 6, 2019

(65) Prior Publication Data

US 2020/0081911 A1 Mar. 12, 2020

Related U.S. Application Data

(60) Provisional application No. 62/757,076, filed on Nov. 7, 2018.

(30) Foreign Application Priority Data

Sep. 7, 2018 (IN) .............................. 201841033646

(51) Int. Cl.
*G06F 16/35* (2019.01)
*G06N 20/00* (2019.01)
(Continued)

(52) U.S. Cl.
CPC ........ *G06F 16/353* (2019.01); *G06F 16/3346* (2019.01); *G06N 7/005* (2013.01); *G06N 20/00* (2019.01)

(58) Field of Classification Search
CPC ... G06F 16/353; G06F 16/3346; G06N 20/00; G06N 7/005
See application file for complete search history.

(56) References Cited

U.S. PATENT DOCUMENTS 5,442,778 A 8/1995 Pedersen
6,049,797 A 4/2000 Guha
(Continued)

OTHER PUBLICATIONS

PCT; App. No. PCT/US2019/049883; International Search Report and Written Opinion dated Nov. 8, 2019.

*Primary Examiner* — Vaishali Shah
(74) *Attorney, Agent, or Firm* — Fitch, Even, Tabin & Flannery LLP

(57) ABSTRACT

A control circuit obtains and utilizes a first set of rules that determines a distance, as a function of a modified Jaccard distance, between each of a number of predetermined classes. The control circuit utilizes that information to generate groups of the predefined classes by evaluating the distance between each of the predetermined classes. First probabilities for each of the additional text entries regarding membership in each of the groups so generated is calculated along with second probabilities regarding membership in a particular one of the predefined classes in its corresponding group. A resultant probability is then calculated using the first and second probabilities that a given additional text entry belongs to a particular one of the predefined classes. The control circuit then utilizes that resultant probability information to automatically classify additional text entries by associating the given additional text entry to a particular one of the predefined classes.

16 Claims, 3 Drawing Sheets

(51) Int. Cl.
   *G06N 7/00*      (2006.01)
   *G06F 16/33*     (2019.01)

(56)     References Cited

U.S. PATENT DOCUMENTS

| | | |
|---|---|---|
| 6,385,602 B1 | 5/2002 | Tso |
| 7,158,983 B2 | 1/2007 | Willse |
| 7,890,445 B2 | 2/2011 | Ben Hur |
| 8,355,997 B2 | 1/2013 | Kirshenbaum |
| 8,620,842 B1 * | 12/2013 | Cormack ............... G06N 20/00 |
| | | 706/12 |
| 8,903,825 B2 | 12/2014 | Parker |
| 9,483,741 B2 | 11/2016 | Sun |
| 2014/0279716 A1 | 9/2014 | Cormack |
| 2015/0331936 A1 | 11/2015 | Alqadah |
| 2016/0092434 A1 * | 3/2016 | Bellegarda ............. G06F 40/58 |
| | | 704/9 |
| 2016/0092557 A1 | 3/2016 | Stojanovic |
| 2017/0116332 A1 | 4/2017 | Andrade Silva |
| 2018/0121533 A1 | 5/2018 | Magnani |
| 2019/0171913 A1 * | 6/2019 | Cheng .................. G06K 9/6282 |

* cited by examiner

METHOD AND APPARATUS TO MORE QUICKLY CLASSIFY ADDITIONAL TEXT ENTRIES

CROSS-REFERENCE TO RELATED APPLICATIONS

This application claims the benefit of Indian Application Number 201841033646, filed Sep. 7, 2018, and U.S. Provisional Application No. 62/757,076, filed Nov. 7, 2018, which is incorporated herein by reference in its entirety.

TECHNICAL FIELD

These teachings relate generally to the automatic classification of text entries.

BACKGROUND

Some data stores contain text entries. And some data stores contain an enormous number of text entries. For example, a retail portfolio for a large retailer can contain millions of textually-described items belonging to thousands of categories. Furthermore, on a regular basis (for example, monthly), thousands of new items are added to the portfolio. It would be an extremely time-consuming task to manually classify every new item into one of the thousands of categories.

There are known machine-based processes to automatically conduct such a classification task. Unfortunately known processes tend to be extremely time consumptive when the number of available candidate classes exceeds, for example, one thousand. This is at least partly because known available machine-learning techniques often rely on models that become very unstable when used in such an application setting (i.e., with so many classes) and that are also extremely computationally intensive

BRIEF DESCRIPTION OF THE DRAWINGS

The above needs are at least partially met through provision of the method and apparatus to more quickly classify additional text entries described in the following detailed description, particularly when studied in conjunction with the drawings, wherein.

Figure 1:
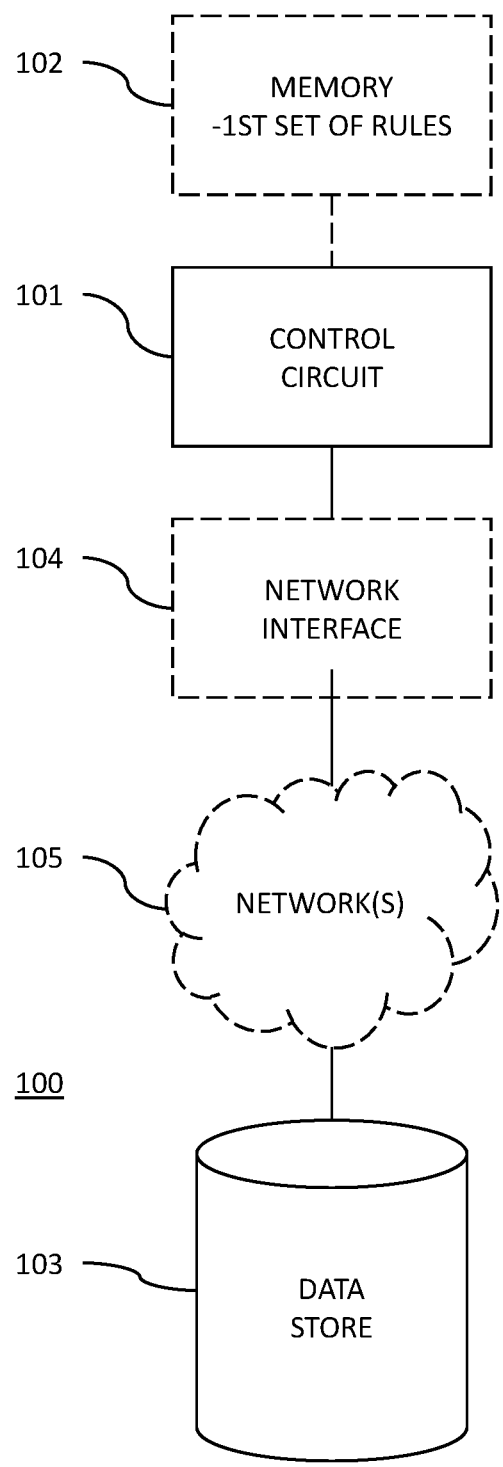
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where specific meanings have otherwise been set forth herein.

DETAILED DESCRIPTION

Generally speaking, pursuant to these various embodiments a control circuit can reliably and quickly automatically classify additional text entries to be added to a large data store that contains a very large number of text entries that are classified with respect to predefined classes. The control circuit obtains and utilizes a first set of rules that determines a distance, as a function of a modified Jaccard distance, between each of the predetermined classes. The control circuit then utilizes that information to generate groups of the predefined classes by evaluating the distance between each of the predetermined classes. First probabilities for each of the additional text entries regarding membership in each of the groups so generated is calculated along with second probabilities regarding membership in a particular one of the predefined classes in its corresponding group. The control circuit then calculates a resultant probability, using the first and second probabilities, that a given additional text entry belongs to a particular one of the predefined classes. The control circuit then utilizes that resultant probability information to automatically classify given additional text entries by associating the given additional text entry to a particular one of the predefined classes.

These teachings will readily accommodate a data store having a plurality of text entries that exceeds 1 million entries or more and where the predefined classes exceed 1000 classes in number. By one approach the number of generated groups is at least one or two orders of magnitude less than the number of predefined classes.

By one approach, the aforementioned modified Jaccard distance is computed, at least in part, by dividing a number of words-in-common for two of the predefined classes by a number of words corresponding to a smaller of the two predefined classes to derive a calculated result that is then subtracted from 1.

By one approach, the aforementioned first probability and/or second probability is calculated using one or more machine learning processes. The aforementioned resultant probability, if desired, can be calculated by multiplying the aforementioned first probability by the aforementioned second probability for a given one of the additional text entries.

The above-described steps are quickly accomplished using readily-available computing resources. By utilizing the automatic classification process as described, a large number of additional text entries can be automatically classified into one of a large number of predefined classes using considerably less time than those skilled in the art would ordinarily presume necessary using prior art approaches when employing the same computing resources. For example, these teachings will permit automatic classification to begin and complete in many cases in at least 1/10 the time of corresponding prior art approaches.

These and other benefits may become clearer upon making a thorough review and study of the following detailed description. Referring now to the drawings, and in particular to FIG. 1, an illustrative apparatus that is compatible with many of these teachings will now be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

By one optional approach the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to a first set of rules (described in detail further herein), this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 101 operably couples to a data store 103. This data store 103 stores an existing plurality of text entries. For the sake of an illustrative example it is presumed here that at least a majority of these text entries each corresponds to a particular physical item (such as the items that a retailer maintains in inventory for sale to customers). Also for the sake of an illustrative example it is presumed here that the data store 103 contains more than one hundred thousand discrete and separate text entries. In fact, these teachings are highly scalable in these regards and can be readily applied with a considerably larger number of existing text entries, such as a number of text entries that exceeds one million entries.

These text entries are already organized into a plurality of predefined classes. As a simple example, the plurality of text entries may include entries individually representing each of eleven different varieties of apple, in which case these particular text entries may belong to a predefined class for "apples" in general. For the sake of an illustrative example it is presumed here that the number of predefined classes exceeds one thousand classes in number.

Figure 3:
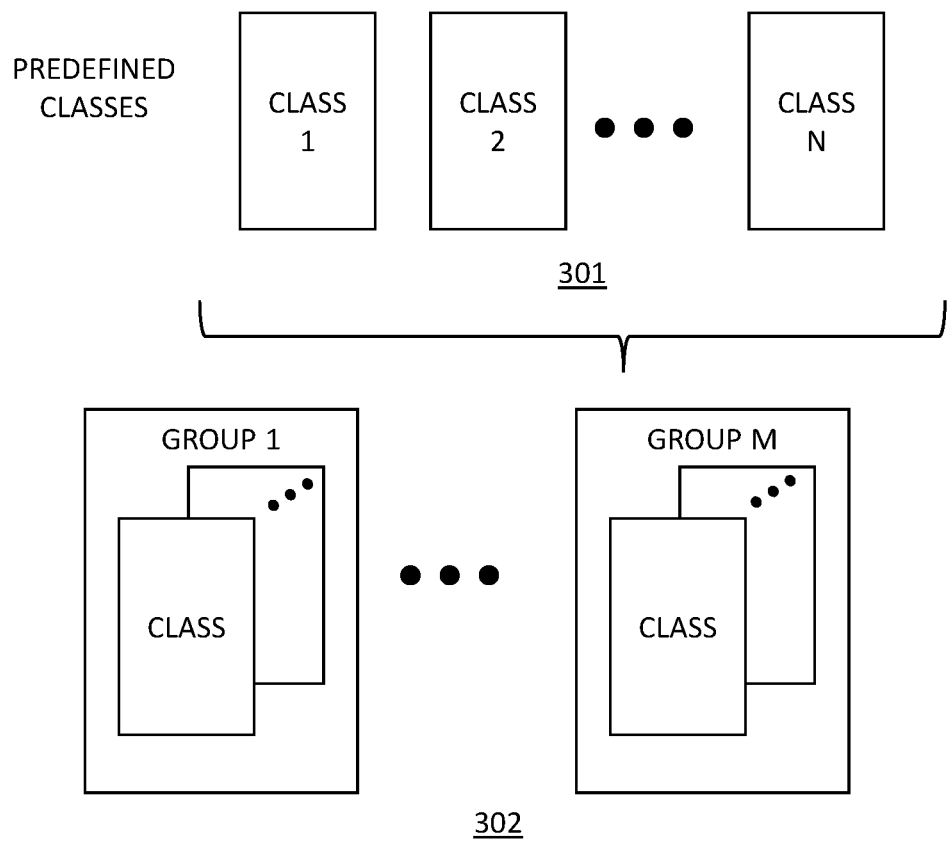
FIG. 3 comprises a schematic representation as configured in accordance with various embodiments of these teachings.

FIG. 3 provides a simple illustrative example in these regards. In this example the predefined classes 301 range from "class 1" to "class N" where "N" is an integer greater than 1000.

Referring again to FIG. 1, by one optional approach, the control circuit 101 also operably couples to a network interface 104 that in turn couples to one or more communications networks 105. A non-exhaustive listing of potentially useful network interfaces would include Universal Serial Bus (USB)-based interfaces, RS232-based interfaces, I.E.E.E. 1394 (aka Firewire)-based interfaces, Ethernet-based interfaces, any of a variety of so-called Wi-Fi'-based wireless interfaces, Bluetooth-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 101 to another such machine, to a local area network, or to any of a variety of wide area networks or extranets (such as, but not limited to, the Internet). So configured the control circuit 101 can communicate with other elements (such as the aforementioned data store 103) via the network interface 104.

Figure 2:
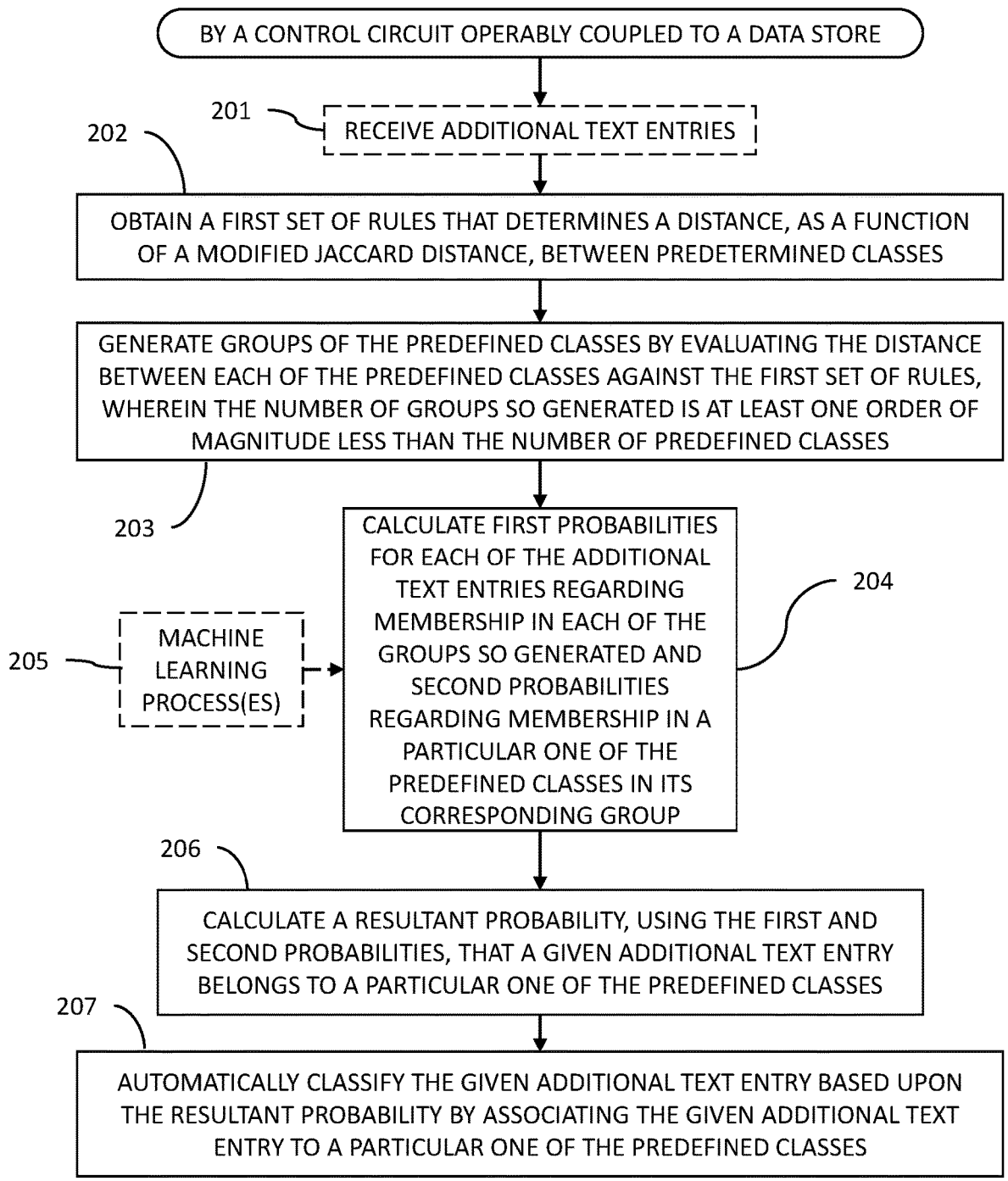
FIG. 2 comprises a flow diagram as configured in accordance with various embodiments of these teachings.

Referring now to both FIG. 1 and FIG. 2, such a control circuit 101 can serve to carry out the illustrated process 200.

Generally speaking, this process 200 serves to facilitate a more efficient automatic classification of additional text entries that have been added to the above-described plurality of text entries in the data store 103 with respect to the above-described predefined classes. By "more efficient," it is meant that this process 200 can effect automated classification of these additional text entries with respect to the predefined classes in considerably less time than would ordinarily be expected using prior art automated classification methods and processes. The savings in time can be dramatic. For example, while a given prior art process might require many hours or even days to accomplish the requisite task, these teachings will complete the task in considerably less time than one hour using the same computational resources.

At optional block 201 the process 200 provides for receiving the aforementioned additional text entries. This can be accomplished in any of a variety of ways. By one approach these additional text entries are simply added in due course to the existing plurality of text entries (albeit in an unclassified form). In such a case the control circuit 101 can sort the contents of the data store 103 to retrieve those additional text entries for these purposes. By another approach these additional text entries are provided to the control circuit 101 as a separate and contiguous whole. These teachings will accommodate other approaches in these regards if and as desired.

At block 202 the process 200 provides for obtaining a first set of rules that determine a distance, as a function of a modified Jaccard distance, between each of the predetermined classes. For example, this first set of rules can comprise computing the modified Jaccard distance by, at least in part, dividing a number of words-in-common for two of the predefined classes by a number of words corresponding to a smaller of the two predefined classes to derive a calculated result and then subtracting that calculated result from 1. The foregoing rule can be described as:

$$\text{Modified Jaccard Distance} = \frac{\text{Number of common words between groups } A \text{ and } B}{\text{Minimum of the number of words in group } A \text{ and group } B}$$

At block 203 of the process 200 the control circuit 101 then effectively provides for hierarchical classification of items based on text features by generating groups of the predefined classes by evaluating the distance between each of the predefined classes against the aforementioned first set of rules. Pursuant to these teachings the number of groups so generated is at least one order of magnitude less than the number of predefined classes. For many application settings it will be preferable for the number of groups so generated to be at least two orders of magnitude less than the number of predefined classes.

By one approach the resultant number of groups can be dynamically determined. By another approach, the number of generated groups of the predefined classes comprises a predetermined number of the groups. By yet another approach, the number of generated groups of the predefined classes comprises a dynamically determined number that is constrained to be more than a predetermined minimum number of generated groups but less than a predetermined maximum number of generated groups.

By one beneficial approach this activity serves to cluster similar items using a modified Jaccard distance into a pre-specified number of groups using hierarchical clustering, with constraints based on the number of classes in each group. For example, this process 200 may limit the number of class in any particular group to no more than 10, 15, 25, or 100 classes as desired. This process 200 may also require that any given group have at least a minimum number of classes, such as 2 classes or 5 classes as desired. So configured, these teachings use hierarchical clustering to form meaningful smaller groups of items (as compared to the initial ungrouped textual corpus).

Referring momentarily to FIG. 3, in an illustrative simple example the predefined classes 301 are grouped into a number of groups ranging from "group 1" to "group M" where "M" is an integer that is at least one (or more) order of magnitude less than the number of predefined classes "N."

At block 204 the control circuit 101 calculates first probabilities for each of the additional text entries regarding membership in each of the groups so generated. The control circuit 101 also calculates second probabilities regarding membership in a particular one of the predefined classes in its corresponding group.

By one approach the control circuit 101 employs one or more machine learning processes 205 to make these calculations for either one or both of the first and second probabilities. Examples of useful machine learning processes include but are not limited to generalized linear models, deep neural networks, random forests, gradient boosting machines, and so forth. These teachings are flexible in these regards. By one approach, the control circuit 101 calculates both the first probabilities and the second probabilities using a same machine learning process 205. By another approach, the control circuit 101 calculates the first probabilities using a first machine learning process and the second probabilities using a second machine learning process that is different than the first machine learning process.

For example, by one approach this activity comprises training models using different machine learning techniques to predict the probability of each item belonging to a particular group and belonging to a particular class within each group.

At block 206 the control circuit 101 then calculates a resultant probability, using both the first and second probabilities, that a given additional text entry belongs to a particular one of the predefined classes. By one approach this calculation comprises multiplying the aforementioned first probability by the aforementioned second probability for the given additional text entry.

At block 207 the control circuit 101 then automatically classifies each given additional text entry based upon the resultant probability by associating the given additional text entry to a particular one of the predefined classes. So configured, the additional text entries are automatically placed into one of a large number of predefined classes in a considerably faster manner than would ordinarily be associated with prior art practices in these regards employing the same computational resources.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus to automatically classify additional text entries with respect to an existing plurality of text entries that are contained within a data store, wherein the plurality of text entries exceeds one hundred thousand entries by automatically classifying the additional text entries with respect to predefined classes for the plurality of text entries wherein the predefined classes comprise a number of predefined classes that exceeds one thousand classes, the apparatus comprising:
    a control circuit operably coupled to the data store and being configured to:
    obtain a first set of rules that determines a distance, as a function of a modified Jaccard distance, between each of the predefined classes, wherein the modified Jaccard distance is calculated, at least in part, by dividing a number of words-in-common for two of the predefined classes by a number of words corresponding to a smaller of the two predefined classes to derive a calculated result and then subtracting that calculated result from 1;
    generate groups of the predefined classes by evaluating the distance between each of the predefined classes against the first set of rules, wherein a number of groups so generated is at least one order of magnitude less than the number of predefined classes;
    training at least one machine learning probability prediction model based on the generated groups of the predefined classes;
    applying the at least one machine learning probability prediction model to predict first probabilities for each of the additional text entries regarding membership in each of the groups so generated and second probabilities regarding membership in a particular one of the predefined classes in its corresponding group;
    calculate, as a function of the first probabilities and the second probabilities, a resultant probability-that a given additional text entry belongs to a particular one of the predefined classes;

automatically classify the given additional text entry based upon the resultant probability by associating the given additional text entry to a particular one of the predefined classes.

2. The apparatus of claim 1 wherein the plurality of text entries exceeds one million entries.

3. The apparatus of claim 2 wherein at least a majority of the plurality of text entries each corresponds to a particular physical item.

4. The apparatus of claim 1 wherein the number of groups so generated is at least two order of magnitude less than the number of predefined classes.

5. The apparatus of claim 1 wherein the control circuit is configured to generate the groups of the predefined classes by generating a predetermined number of the groups.

6. The apparatus of claim 1 wherein the control circuit is configured to apply the at least one machine learning probability prediction model to predict the first probabilities and the second probabilities wherein a same machine learning probability prediction model is applied to predict the first probabilities and the second probabilities.

7. The apparatus of claim 1 wherein the control circuit is configured to apply the at least one machine learning probability prediction model to predict the first probabilities and the second probabilities based on a first machine learning probability prediction model to predict the first probabilities and a second machine learning probability prediction model that is different from the first machine learning probability prediction model to predict the second probabilities.

8. The apparatus of claim 1 wherein the control circuit is configured to calculate the resultant probability by multiplying a first probability from the first probabilities by a second probability from the second probabilities.

9. A method to automatically classify additional text entries with respect to an existing plurality of text entries that are contained within a data store, wherein the plurality of text entries exceeds one hundred thousand entries by automatically classifying the additional text entries with respect to predefined classes for the plurality of text entries, wherein the predefined classes comprise a number of predefined classes that exceeds one thousand classes, the method comprising:

by a control circuit operably coupled to the data store:
    obtaining a first set of rules that determines a distance, as a function of a modified Jaccard distance, between each of the predefined classes, wherein the modified Jaccard distance is calculated, at least in part, by dividing a number of words-in-common for two of the predefined classes by a number of words corresponding to a smaller of the two predefined classes to derive a calculated result and then subtracting that calculated result from 1;
    generating groups of the predefined classes by evaluating the distance between each of the predefined classes against the first set of rules, wherein a number of groups so generated is at least one order of magnitude less than the number of predefined classes;
    training at least one machine learning probability prediction model based on the generated groups of the predefined classes;
    applying the at least one machine learning probability prediction model to predict first probabilities for each of the additional text entries regarding membership in each of the groups so generated and second probabilities regarding membership in a particular one of the predefined classes in its corresponding group;
    calculating, as a function of the first probabilities and the second probabilities, a resultant probability that a given additional text entry belongs to a particular one of the predefined classes;
    automatically classifying the given additional text entry based upon the resultant probability by associating the given additional text entry to a particular one of the predefined classes.

10. The method of claim 9 wherein the plurality of text entries exceeds one million entries.

11. The method of claim 10 wherein at least a majority of the plurality of text entries each corresponds to a particular physical item.

12. The method of claim 9 wherein the number of groups so generated is at least two order of magnitude less than the number of predefined classes.

13. The method of claim 9 wherein generating the groups of the predefined classes comprises generating a predetermined number of the groups.

14. The method of claim 9 wherein applying the at least one machine learning probability prediction model to predict the first probabilities and the second probabilities comprises applying a same machine learning probability prediction model to predict the first probabilities and the second probabilities.

15. The method of claim 9 wherein applying the at least one machine learning probability prediction model to predict the first probabilities and the second probabilities is based on a first machine learning probability prediction model to predict the first probabilities and a second machine learning probability prediction model that is different from the first machine learning probability prediction model to predict the second probabilities.

16. The method of claim 9 wherein calculating the resultant probability comprises multiplying a first probability from the first probabilities by a second probability from the second probabilities.

* * * * *

UNITED STATES PATENT AND TRADEMARK OFFICE
CERTIFICATE OF CORRECTION

| | |
|---|---|
| PATENT NO. | : 11,216,501 B2 |
| APPLICATION NO. | : 16/562813 |
| DATED | : January 4, 2022 |
| INVENTOR(S) | : Vallabhajosyula et al. |

It is certified that error appears in the above-identified patent and that said Letters Patent is hereby corrected as shown below:

In the Claims

Claim 1, Column 6, Line 65, delete "probability-" and insert --probability--.

Signed and Sealed this
Twenty-eighth Day of June, 2022

Katherine Kelly Vidal
*Director of the United States Patent and Trademark Office*